United States Patent [19]

Shiraki et al.

[11] Patent Number: 4,995,658
[45] Date of Patent: Feb. 26, 1991

[54] DOOR LOCKING DEVICES

[75] Inventors: Manabu Shiraki, Yamato; Osamu Hamaguchi, Nirasaki, both of Japan

[73] Assignee: Sicoh Engineering Co., Ltd., Tokyo, Japan

[21] Appl. No.: 559,093

[22] Filed: Jul. 30, 1990

[30] Foreign Application Priority Data

Aug. 4, 1989 [JP] Japan .................. 64-201200

[51] Int. Cl.⁵ ........................... E05B 47/00
[52] U.S. Cl. .................. 292/336.3; 292/201; 74/98; 74/625
[58] Field of Search .......... 292/336.3, 201; 74/625, 74/405, 411, 406, 626, 773, 802, 354, 98

[56] References Cited

U.S. PATENT DOCUMENTS

| | | | |
|---|---|---|---|
| 4,543,839 | 10/1985 | Buchanan, Jr. et al. | 74/98 |
| 4,573,723 | 3/1986 | Morita et al. | 292/336.3 |
| 4,706,512 | 11/1987 | McKernon et al. | 292/336.3 X |
| 4,779,912 | 10/1988 | Ikeda et al. | 292/336.3 |
| 4,885,954 | 12/1989 | Wanlass | 292/336.3 X |

Primary Examiner—Richard E. Moore
Attorney, Agent, or Firm—Finnegan, Henderson Farabow, Garrett & Dunner

[57] ABSTRACT

A door locking device wherein first and second field magnets are disposed at respective stationary positions opposite to each other through an axial air gap; the first field magnet has 2P (P: an integer of at least 2) contiguous poles of alternating N and S polarity and is formed in a torus shape; the second field magnet has n pole(s) (n: an integer of at least 1) of alternating N and S poles and is formed so as to define a space capable of receiving a swingable driven gear in the plane opposite to a rotatable coreless armature and hence not to become a complete torus form; a rotatable coreless armature is rotatably provided between the first and second field magnets; a commutator is provided on the rotatable coreless armature so as to rotate integrally therewith; brushes coming into movable contact with the commutator are provided on its corresponding stationary side; a driving gear rotating integrally with the rotatable coreless armature is disposed concentrically with the armature; a back yoke for the second field magnet is extended and bent to define a swingable driven gear-receiving space; the swingable driven gear is engaged with the driving gear so that it may be received and disposed in the swingable driven gear-receiving space; and an output lever is swingably attached to the output gear shaft.

3 Claims, 3 Drawing Sheets

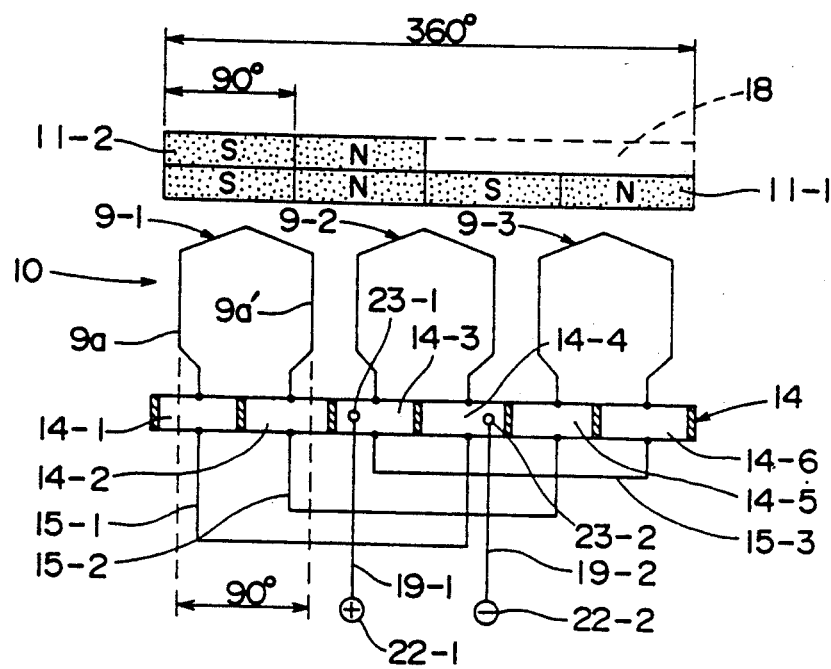
FIG. 4
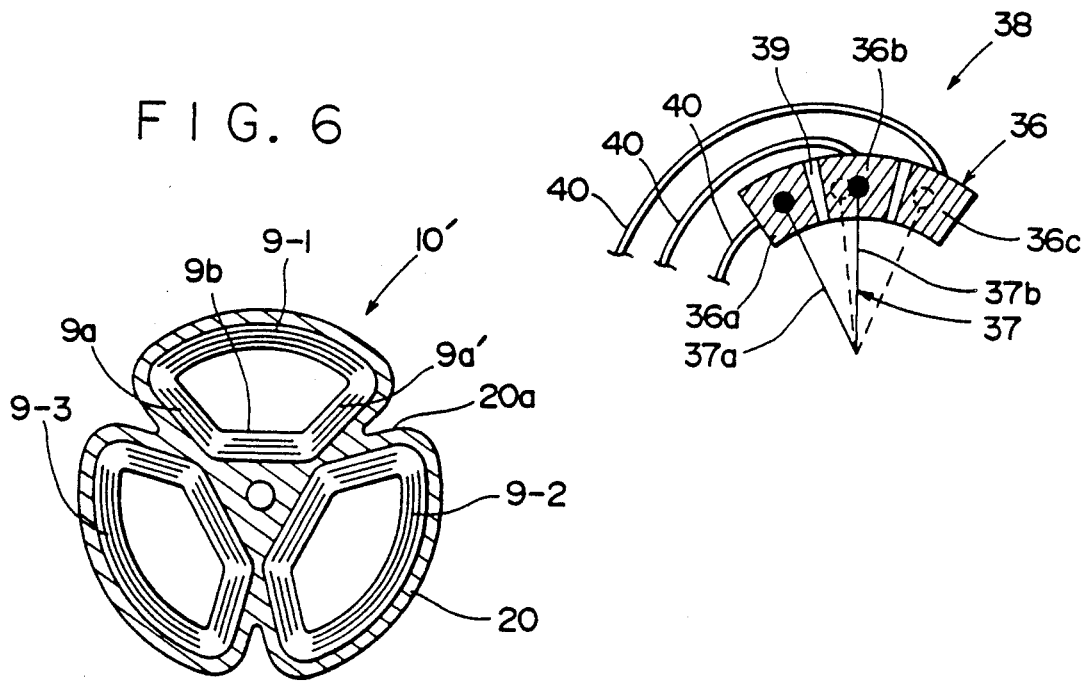
FIG. 5
FIG. 6

DOOR LOCKING DEVICES

BACKGROUND OF THE INVENTION

1. Field of the Invention

The present invention relates to door locking devices requiring rotation output such as actuators for locking doors of cars or rooms, and especially to a door locking device which is simple in structure, economical, small in noise upon actuating it, and able to provide swing or rotation output fast and smooth.

2. Description of the Related Art

A variety of electric actuators have heretofore been used in door locking devices for cars, rooms and the like. Many of such electric actuators make use of electromagnets. Therefore, they involve a drawback that rasping and loud crashing sound is produced. When used in a door locking mechanism for cars by way of example, such rasping and loud crashing sounds are very uncomfortable. Therefore, in order to reduce the noise of door locking devices, the use of a d.c. motor of a core-equipped structure in a locking device has come to be attempted in recent years.

However, such a door locking device is such that a conventional d.c. motor is simply used as is. A d.c. motor having a structure adapted to the mechanism of the door locking device is not used. Since any d.c. motor with the performance of the device itself, for example, a door locking mechanism for cars or the like, taken into consideration is unknown, the door locking device involves a drawback that it requires a complex structure making use of a multiple gear composed of plural gears and hence becomes large in size and expensive.

In addition, since the structure of such a d.c. motor is poor in efficiency, and is an axial air-gap type core-equipped structure, cogging is produced to a great extent, so that the motor cannot be actuated smoothly and its responsibility is inferior. Moreover, with respect to the door locking device making use of such a d.c. motor, the responsibility is also poor because of the multiple gear used in the motor. Furthermore, it has a drawback that great force is required when the door locking device is operated manually and moreover involves a demerit that it produces a loud noise of release.

Furthermore, since there is a recent tendency for the thickness of car doors to be reduced, so that the space for building in a door locking device is limited, the conventional door locking device making use of the d.c. motor of the core-equipped structure involves a demerit that it is troublesome to successfully dispose it in a door body of a small thickness.

SUMMARY OF THE INVENTION

With the foregoing circumstances in view, the present invention has as an object the provision of a door locking device which has a small thickness as a whole, can be easily disposed in a door body, makes use of only a few gears, is simple in structure, can be fabricated with ease and mass-produced economically, permits smooth actuation and high-speed response, can be easily actuated with small force even when operated manually, produces only an extremely low sound of actuation and a low crashing sound, is free of any useless space except for a swing path of a swingable driven gear, provides great torques, and scarcely vibrates axially.

In an aspect of this invention, there is thus provided a door locking device in which first and second field magnets are disposed at respective stationary positions opposite to each other through an axial air gap to provide stators; the first field magnet has 2P contiguous poles of alternating N and S polarity, wherein P is an integer of at least 2, and is formed in a torus shape; the second field magnet has n pole(s) each of contiguous and alternating N and S magnetic poles, wherein n is an integer of at least 1 provided that 2P is greater than n, and is formed so as to define a space capable of receiving a swingable driven gear in the plane opposite to a rotatable coreless armature and hence not to become a complete torus form; an m-phase rotatable coreless armature, wherein m is the number of phases and an integer of at least 2, composed of k armature coils, wherein k is an integer of at least 2, is rotatably provided between the first field magnet and the second field magnet; a commutator is provided on the rotatable coreless armature so as to rotate integrally therewith; brushes coming into movable contact with the commutator are provided on its corresponding stationary side; a driving gear rotating integrally with the rotatable coreless armature is disposed concentrically with the armature; a back yoke for the second field magnet is extended and bent so as to face the rotatable coreless armature at the position of the space defined with respect to the second field magnet through a slight air gap to define a swingable driven gear-receiving space on the lower side of the extended and bent portion; the swingable driven gear, which is fixed to an output gear shaft supported rotatably and is provided swingably by a predetermined angle, is engaged with the driving gear in an interlocking relation so that it may be received and disposed in the swingable driven gear-receiving space; and an output lever transmitting a mechanical output on the locking/unlocking side of a door is swingably attached to the output gear shaft, to which the swingable driven gear has been fixed.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIG. 4 is a development of field magnets and a rotatable coreless armature;

FIG. 5 is an explanatory illustration of a switching mechanism;

FIG. 6 is a bottom plan view of a rotatable coreless armature according to a second embodiment of this invention.

DETAILED DESCRIPTION OF THE INVENTION AND PREFERRED EMBODIMENTS

Figure 1:
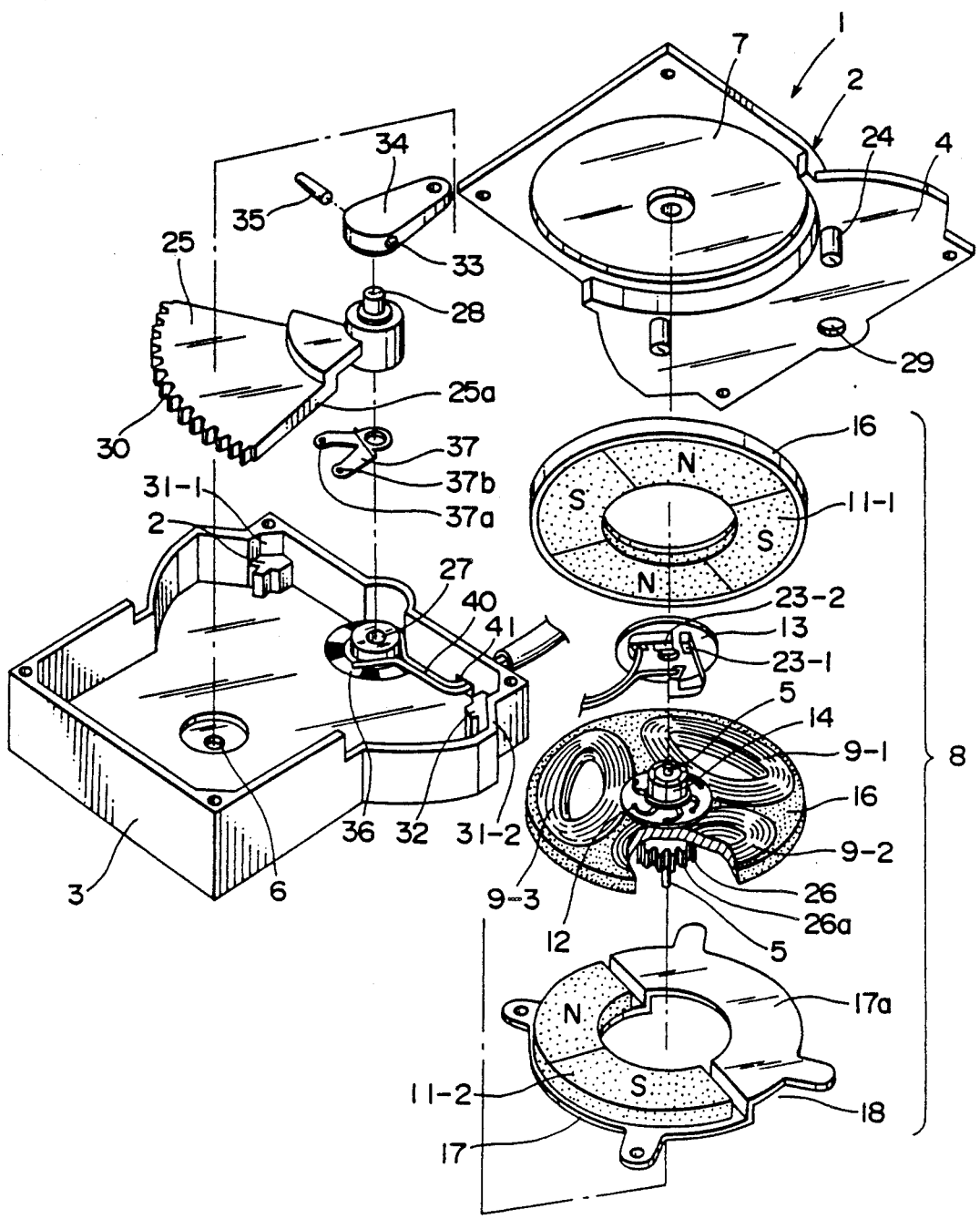
FIG. 1 is an exploded perspective view of a door locking device having a structure suitable for use in a door locking mechanism for cars according to a first embodiment of this invention.
Figure 2:
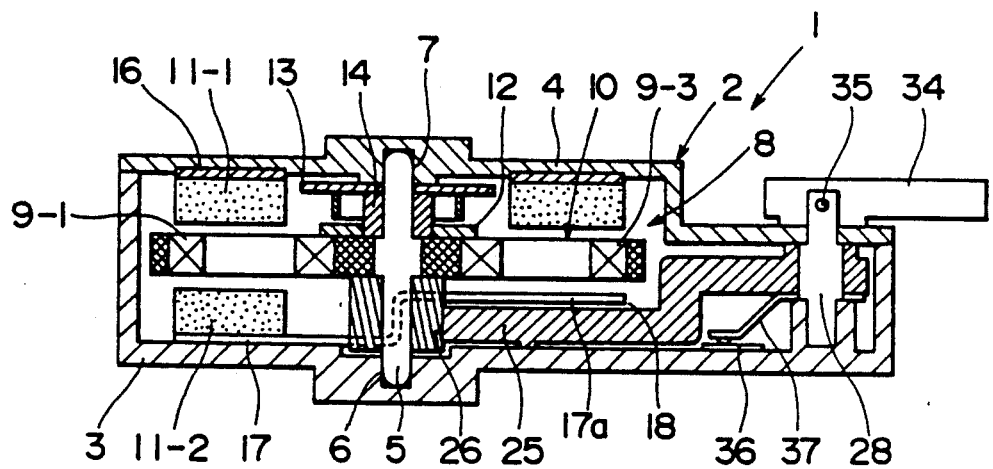
FIG. 2 is a side vertical section of the door locking device.

Referring now to FIGS. 1 through 5, a door locking device according to one embodiment of this invention will hereinafter be described.

The door locking device 1 is disposed and fixed in the interior of an illustrated door body in parallel with a door wall. Therefore, a body 2 of the door locking device 1 is preferably formed in a thin-walled, substantially rectangular cube. For this reason, the body 2 is formed by providing a casing 3, which has been formed of any suitable material such as a magnetic substance such as a mild steel sheet, an aluminum-diecast, a resin or the like, is hollow, opens at its upper end and is in the form of a rectangular cube and closing the opening at the upper end with a cover 4 through screws or the like.

In the casing 3, there is formed a hole 6 rotatably supporting the lower end of a shaft 5 and having a bearing function, in which the hole a step for preventing the shaft from passing through is formed. In the cover 4, is provided a thrust pad 7 coming into contact with the upper end of the shaft 5. The shaft 5 is rotatably supported by both hole 6 and thrust pad 7.

Figure 3:
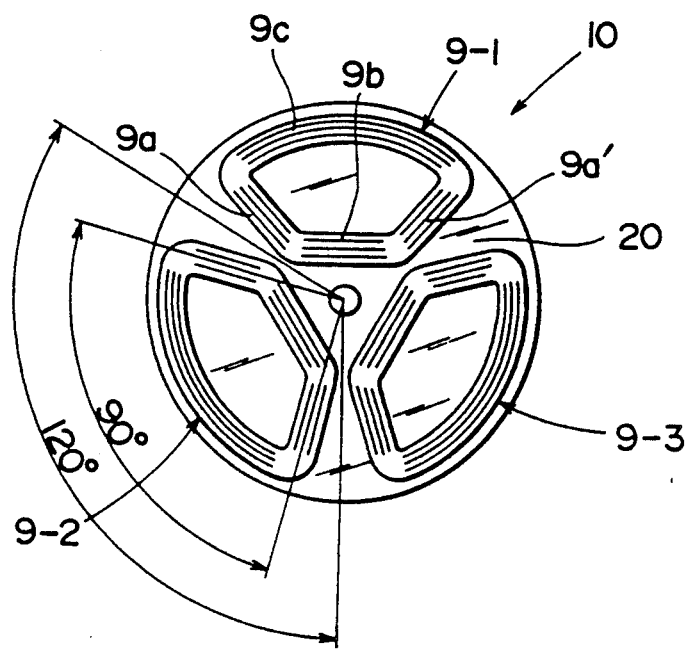
FIG. 3 is a bottom plan view of a rotatable coreless armature.

Three armature coils 9-1, 9-2, 9-3 of the air-core type are arranged at equal intervals with a pitch of 120 degrees so as not to overlap with one another, as illustrated in FIGS. 1 and 3, to form a rotatable coreless armature 10 so as to rotate integrally with the shaft 5. To the shaft 5, are fixed a commutator 14 composed of six commutator segments 14-1, . . . , 14-6 and an electrical connection board 12 in the form of a disc so as to rotate integrally with the rotatable coreless armature 10.

Each of the above-mentioned armature coils 9-1, 9-2, 9-3 is desirably formed into an air-core type armature coil with axial conductor portions 9a and 9a', which contribute to the generation of torques and are formed with an opening angle therebetween ranging from 160 to 220 degrees in terms of electric angle (said opening angle being measured on the basis of the axial center lines of the conductor portions 9a, 9a'), in order to form a three-phase coreless commutator-rotating actuator mechanism 8 of the axial air-gap type, which is hard to generate reverse torque and is good in efficiency. In this embodiment, in order to make each armature coil free from generation of reverse torques as much as possible and good in efficiency, the armature coil has been formed into a sector-like air-core type by winding a wire to suitable turns at an opening angle of 90 degrees in such a manner that an opening angle between the conductor portions 9a and 9a', which contribute to the generation of torques, is equal to the width (90 degrees, or 180 degrees in terms of electric angle) of one magnetic pole of N and S poles in a first field magnet, which will be described subsequently, as illustrated in FIG. 3. Incidentally, circumferential conductor portions 9b, 9c of each armature coil 9-1, 9-2 or 9-3 do not contribute to the generation of torques.

By the way, as the rotatable coreless armature 10 composed of the three air-core type armature coils 9-1, 9-2, 9-3 described above, there is used that obtained by molding a resin 20 together with the three air-core type armature coils 9-1, 9-2, 9-3 into a disc shape and setting the resin in a state that they are arranged at equal intervals with a pitch of 120 degrees so as not to overlap with one another, as depicted in FIGS. 1 and 3, in order to form a firm rotatable coreless armature 10.

The electrical connection board 12 is fixed on the upper surface of the thus-set rotatable coreless armature 10 in a disc form by any suitable means such as an adhesive to achieve suitable electrical connection between the commutator segments 14-1, . . . , 14-6 and the armature coils 9-1, 9-2, 9-3 through the electrical connection board 12 as illustrated in FIG. 4.

Two brushes 23-1, 23-2 disposed at an opening angle of 90 degrees on a brush holder 13 fixedly provided on the inner surface of the cover 4 are brought into movable contact with the commutator 14 composed of the six commutator segments 14-1, . . . , 14-6.

Referring now to FIG. 4, one terminal of each armature coil 9-1, 9-2 or 9-3 is electrically connected in order to the commutator segments 14-1, 14-3 and 14-5, while the other terminal of each armature coil 9-1, 9-2 or 9-3 is electrically connected in order to the commutator segments 14-2, 14-4 and 14-6, so that Δ connection is achieved by the electrical connection between the commutator segments 14-1, . . . , 14-6 through conductive patterns 15-1, 15-2, 15-3 for electrical connection (hereinafter simply called "conductive pattern(s)"), which have been formed on the electrical connection board 12.

Namely, the conductive pattern 15-1 formed on the electrical connection board 12 is electrically connected to the commutator segment 14-1 at one end thereof and to the commutator segment 14-4 at the other end thereof.

The conductive pattern 15-2 formed on the electrical connection board 12 is electrically connected to the commutator segment 14-3 at one end thereof and to the commutator segment 14-6 at the other end thereof.

The conductive pattern 15-3 formed on the electrical connection board 12 is electrically connected to the commutator segment 14-2 at one end thereof and to the commutator segment 14-5 at the other end thereof.

The brushes 23-1 and 23-2 connected respectively to a positive-side power terminal and a negative-side power terminal through respective lead wires 19-1 and 19-2 are pressed on the side of the commutator 14 and brought into movable contact therewith, so that commutation is achieved.

In the above embodiment, the Δ connection has been described. Needless to say, the present invention is not limited thereto, but Y-connection may be used.

On the inner surface of the cover 4, which is disposed in a face-to-face relation with the upper surface of the rotatable coreless armature 10 through an axial air gap, projections 24 for pressing a back yoke 16, which serves to close the magnetic path of the above-described first field magnet 11-1, are formed to position the back yoke, so that the back yoke 16 is fixedly disposed. The first field magnet having four poles of alternating N and S polarity at a magnetization width of 90 degrees and formed in a torus shape is fixed to the back yoke 16 and caused to position in a face-to-face relation with the rotatable coreless armature 10 through the axial air gap.

On the inner surface of the casing 3, which is disposed in a face-to-face relation with the lower surface of the rotatable coreless armature 10 through an axial air gap, the second field magnet 11-2 having two poles of N and S polarity at a magnetization width of 90 degrees and formed in a semicircle is fixed through a torus-like back yoke 17 serving to close the magnetic path of the second field magnet 11-2. The second field magnet 11-2 has one each of contiguous N and S magnetic poles, and is formed in a state that a complete torus form is not shaped so as to define a space (a swingable driven gear-receiving space 18) capable of receiving a swingable driven gear 25, which will be described subsequently, on the surface of the back yoke 17 opposite to the rotatable coreless armature 10 through the axial air gap, namely, in a semicircle shape having two magnetic poles.

The back yoke 17 for the second field magnet 11-2 is extended and bent so as to be situated in a face-to-face relation with the rotatable coreless armature 10 at the position of the space (the swingable driven gear-receiving space 18) defined with respect to the second field magnet through a slight axial air gap to define the swingable driven gear-receiving space on the lower side (i.e., the position between the casing 3 and the bent portion 17a) of the extended and bent portion 17a formed in close vicinity to the rotatable coreless armature 10.

By constituting in the above-described manner, there is provided a three-phase coreless commutator-rotating actuator mechanism 8 of the axial air-gap type, which has a double-sided excitation structure and is good in efficiency.

In this embodiment, although the 4-pole integral magnet in the form of a torus has been used as the first field magnet 11-1, this invention is not limited thereto, but the individual magnetic poles may be formed making use of segment magnets. Also, Although the 2-pole integral magnet in the form of a semicircle has been used as the second field magnet 11-2, the individual magnetic poles may be formed making use of segment magnets without being limited thereto.

As the axial air-gap type coreless commutator-rotating actuator mechanism 8, an example of the three-phase motor configuration, in which the armature coils do not overlap with one another, has been described. Needless to say, the armature coils may be overlapped to one another, and moreover another coreless commutator-rotating actuator mechanism of the different number of phases, i.e., an m-phase coreless commutator-rotating actuator mechanism of the axial air-gap type, wherein m is the so-called number of phases of a motor and an integer of at least 2, composed of a group of k armature coils, wherein k is an integer of at least 2, may be constructed.

Furthermore, as the armature coils 9-1, 9-2, 9-3, the armature coils, which were formed by reciprocally winding a wire, have been used. However, coreless armature coils composed of sheet coils formed by an etching means, press means or the like, printed coils, or the like may be used.

As the commutator 14, that formed of the six commutator segments 14-1, ..., 14-6 has been described. The commutator 14 maY however be composed by 2 mn commutator segments, wherein n is an integer of at least 1. In the above-described axial air-gap type three-phase coreless commutator-rotating actuator mechanism 8 by way of example, since the actuator mechanism is the three-phase motor configuration, the commutator 14 has been composed by 6 commutator segments (in the above numerical expression 2 mn, m=3 and n=1, i.e., 2×3×1=6). When 2 is selected for n, the commutator 14 is composed by 12 (2×3×2=12) commutator segments. Therefore, the number of torque ripples becomes twice compared to the case of the above embodiment. Namely, the magnitude of the torque ripples can be reduced to a half, so that an axial air-gap type three-phase coreless commutator-rotating actuator mechanism 8, which rotate more smoothly, can be fabricated.

On the lower surface of the rotatable coreless armature 10, is fixedly provided a driving gear 26 for speeding up, which is disposed concentrically with the shaft 5 so as to allow it to pass through and has a small diameter.

In the casing 3, there is formed a hole part 27 having a bearing function. The hole part 27 rotatably supports the lower end of an output gear shaft 28 to which the swingable driven gear 25 has been attached. In addition, a through-hole 29 having a bearing function is formed in the cover 4. The through-hole 29 rotatably supports the upper end of the output gear shaft 28 to which the swingable driven gear 25 has been attached. By this mechanism, both output gear shaft 28 and swingable driven gear 25 are rotatably or swingably supported.

The swingable driven gear 25 is made up so as to swing integrally with the output gear shaft 28 by causing the shaft 28 to pass through the support of the gear 25.

The swingable driven gear 25 is formed into a sectorial plate, and a toothed portion 30 is formed at the periphery thereof. The toothed portion 30 is engaged with the driving gear 26 and at the same time, the driven gear 25 is received in the swingable driven gear-receiving space 18.

In this embodiment, the gear ratio of the driving gear 26 to the swingable driven gear 25 is made up to 1:5, so that when the driving gear 26 makes a turn, the swingable driven gear 25 swings by 72 degrees.

Moreover, in order to regulate the swing angle of the swingable driven gear 25 in this embodiment, swing angle-regulating walls 31-1, 31-2 for the swingable driven gear 25 are formed at two positions of the casing 3. Shock-absorbing stopper rubbers 32 are attached at portions, which abut respectively on the radially-extending sides 25a of the swingable driven gear 25, of the swing angle-regulating walls 31-1, 31-2.

The upper end of the output gear shaft 28, which has been rotatably supported by the above-described through-hole 29, extends from the cover 4 through the through-hole 29 to attach an output lever 34 having a hole 33, which intersects with the output gear shaft 28 at almost right angles, to the upper end of the output gear shaft 28. A pin 35 is fitted in the hole 33 to fix the output lever 34, which intersects with the longitudinal axis of the output gear shaft 28 at almost right angles, to the upper end of the output gear shaft 28. In such a manner, the output lever 34 transmitting mechanical output on the locking/unlocking side of a door, which is not illustrated, is swingably attached to the output gear shaft 28 in such a way that the lever 34 intersects with the output gear shaft 28 at almost right angles.

Incidentally, the output lever 34 is connected to a door-locking button through an unillustrated door-locking mechanism having a door locking/unlocking mechanism such as a connecting link mechanism, so that the unillustrated door can be automatically locked or unlocked by the swinging movement of the output lever 34.

When manually locking the door on the other hand, the output lever 34 is swung by means of an unillustrated manual mechanism having a door locking/unlocking mechanism such as a door-locking button, connecting link mechanism and the like, whereby an unillustrated door locking device is actuated.

Along the periphery of the hole part 27 in the casing 3, a switch base 36 is formed and moreover, a switching mechanism 38 composed of the switch base 36 and a two-way switch brush 37 coming into movable contact with the switch base 36 is provided.

Namely, the switch brush 37 coming into movable contact with the switch base 36 is disposed on the upper end of the hole part 27 projecting upward at the lower portion of the output gear shaft 28 so that the switch brash 37 may be rotated in one with the rotation of the output gear shaft 28 while keeping into contact with the switch base 36. As depicted in FIG. 5, the switch base 36 is composed by three contacts 36a, 36b and 36c respectively through insulating parts 39, and is designed in such a manner that the swing position of the swingable driven gear 25 can be detected by knowing whether contacts 37a and 37b of the switch brash 37 are coming into contact respectively with the contacts 36a and 36b or into contact respectively with the contacts 36b and 36c, thereby using the detected signal as a locking or unlocking signal for the door.

Cords 40 connected respectively to the three contacts 36a, 36b, 36c are drawn out through a through-hole 41 defined in the casing 3 to the exterior and are connected to a controller not illustrated.

FIG. 6 is a bottom plan view of a rotatable coreless armature 10' used in a second embodiment of this invention.

In the case of the rotating coreless armature 10, which has been described in the above embodiment and illustrated in FIG. 3, the armature 10 is formed into a disc shape by molding the resin 20 over the outer periphery of the group of the armature coils 9-1, 9-2, 9-3 and setting the resin. However, in order to facilitate manual locking of the door even with small force by reducing the weight load of the rotatable coreless armature 10, which is swung by swinging the output lever 34 through the above unillustrated manual mechanism having the door locking/unlocking mechanism such as door-locking button, connecting link mechanism and the like when the door locking device is actuated, the rotatable coreless armature 10' in this embodiment is formed so that cut-off portions 20a may be defined by cutting off portions of the resin 20 between both sides of the air-core type armature coils 9-1 and 9-2, 9-2 and 9-3, and 9-3 and 9-1 in the rotatable coreless armature 10. By the way, the cut-off portions 20a can be easily formed by using a mold permitting formation of the cut-off portions 20a when the resin 20 is molded into the rotatable coreless armature 10' in advance.

Operation of the door locking device 1 according to this invention having the above-described features will hereinafter be described. When electric currents in predetermined directions are suitably fed to the group of the armature coils 9-1, 9-2, 9-3 respectively through the positive-side power terminal 22-1, negative-side power terminal 22-2, lead wires 19-1, 19-2, brushes 23-1, 23-2, and conductive patterns 15-1, 15-2, 15-3 formed on the electrical connection board 12 in accordance with the signals from the unillustrated controller, torques are generated in predetermined directions in accordance with the Fleming's left hand rule. As a result, the rotor having the rotatable coreless armature 10 or 10' is rotated in the predetermined direction. Moreover, the brushes 23-1, 23-2 and commutator 14 are relatively rotated owing to the rotation of the rotatable coreless armature 10 or 10', whereby commutation is achieved, and electric currents in predetermined directions are fed to the armature coils 9-1, 9-2, 9-3, so that the rotatable coreless armature 10 or 10' is rotated in the predetermined direction. When the rotatable coreless armature 10 or 10' is rotated in the predetermined direction, the driving gear 26 provided concentrically with the shaft 5 thereof is also rotated in the same direction.

By such rotation, swingable driven gear 25 engaged with the driving gear 26 is swung in a predetermined direction.

When the swingable driven gear 25 is swung in the predetermined direction, the output gear shaft 28 to which the swingable driven gear 25 is swingably supported and fixed is rotated in the same direction. When the output gear shaft 28 is rotated, the output lever 34 fixed to the output gear shaft 28 so as to intersect with the shaft 28 at almost right angles is swung in the predetermined direction. Depending on the direction of the swinging movement of the output lever 34, the unillustrated door locking mechanism having the door locking/unlocking mechanism such as the connecting link mechanism, said door locking mechanism interlocking with the output lever 34, can be actuated to automatically lock or unlock the door.

On the other hand, when the door is locked manually, the output lever 34 is swung by means of an unillustrated manual mechanism having a door locking/unlocking mechanism such as a door-locking button, connecting link mechanism and the like, whereby an unillustrated door locking device is actuated. At the same time as the swinging of the output lever 34, the swingable driven gear 25 fixed to the output gear shaft 28 is swung, and the driving gear 26 engaged therewith is hence rotated. Therefore, the rotatable coreless armature 10 or 10' is rotated in a predetermined direction.

Referring now to FIG. 5, when the output gear shaft 28 is rotated, the switch brash 37 is also rotated, so that it is possible to detect the swinging direction and position of the output lever 34 through the cords 40 electrically connecting to the switch base 36 coming into movable contact with the switch brash 37.

ADVANTAGES OF THE INVENTION

As apparent from the above, since the door-locking device according to the present invention uses the axial air-gap type commutator-actuator mechanism of the coreless structure, a door locking device having an extremely small thickness can be fabricated. Therefore, even when the door locking device is built in a device, for example, a car door having a small thickness, and the like, it can be built in the door with extreme ease and in a rational matter.

In addition, since the door locking device can dispense with a few gears without using a multiple gear, its construction becomes simple, and it can be fabricated with ease and mass-produced economically. Moreover, since it has used the axial air-gap type commutator-actuator mechanism of the coreless structure, it is small in torque ripple and permits smooth actuation and high-speed response, so that even when a door is locked manually, for example, in a door locking mechanism, the locking can be easily conducted with small force. Furthermore, the locking device can be fabricated so as to produce only an extremely low sound of actuation and a low crashing sound, and have a long life.

In addition, the axial air-gap type coreless commutator-rotating actuator mechanism used in the door locking device according to this invention as a power output part and having a suitable structure can be built in the door locking device with ease and in a rational matter. Furthermore, a printed board, on which the conductive patterns for electrically connecting between the commutator and armature coils and between the commutator segments have been formed, is formed as one board on the rotatable coreless armature so as to cause it to serve as an commutator-cum-electrical connection board, it is fixedly disposed on the rotatable coreless armature, and the brushes are brought into movable contact with the commutator of the commutator-cum-electrical connection board from the axial direction. Therefore, even when using the commutator, brushes and printed board on which the conductive patterns have been formed, the size of the axial air-gap type coreless commutator-rotating actuator mechanism serving as the power output part does not become large due to these use. In particular, the rotating actuator can be fabricated as that having a very small thickness in the axial direction, and moreover the number of parts can be reduced to facilitate its fabrication. Furthermore, since the electrical connection between the commutator segments constituting the commutator and between the commutator segments and armature coils can be made with extreme ease, the axial air-gap type coreless commutator-rotating actuator mechanism can be mass-produced with ease and at a low price.

In addition to the above advantageous effects, the door locking device according to this invention has the following effects. Since the second field magnet is disposed in the space except for the path of the swingable driven gear, and the back yoke for the second field magnet is extended and bent so as to be close to the rotatable coreless armature at the portion where the second field magnet is not disposed and is opposite to the rotatable coreless armature through an axial air gap, the swingable driven gear can be received in a rational matter as usual. Moreover, since an air-gap distance for closing the magnetic path of the first field magnet by the second field magnet, or by the second field magnet and the extended and bent portion of the back yoke for closing the magnetic path of the second field magnet can be made extremely short compared with the conventional actuator mechanisms, it is possible to provide a door locking device improved so as to produce greatly-enlarged torques and moreover, that producing only an extremely low noise and having a long life because the magnetic balance of the rotatable coreless armature with both stationary sides opposite thereto through an axial air gap is extremely good compared to those of the conventional actuators, so that vibration in an axial direction also becomes less.

What is claimed is:

1. A door locking device characterized in that:

first and second field magnets are disposed at respective stationary positions opposite to each other through an axial air gap to provide stators;

the first field magnet has 2P contiguous poles of alternating N and S polarity, wherein P is an integer of at least 2, and is formed in a torus shape;

the second field magnet has n pole(s) each of contiguous and alternating N and S magnetic poles, wherein n is an integer of at least 1 provided that 2P is greater than n, and is formed so as to define a space capable of receiving a swingable driven gear in the plane opposite to a rotatable coreless armature and hence not to become a complete torus form;

an m-phase rotatable coreless armature, wherein m is the number of phases and is an integer of at least 2, composed of k armature coils, wherein k is an integer of at least 2, is rotatably provided between the first field magnet and the second field magnet;

a commutator is provided on the rotatable coreless armature so as to rotate integrally therewith;

brushes coming into movable contact with the commutator are provided on its corresponding stationary side;

a driving gear rotating integrally with the rotatable coreless armature is disposed concentrically with the armature;

a back yoke for the second field magnet is extended and bent so as to face the rotatable coreless armature at the position of the space defined with respect to the second field magnet through a slight air gap to define a swingable driven gear-receiving space on the lower side of the extended and bent portion;

the swingable driven gear, which is fixed to an output gear shaft supported rotatably and provided swingably by a predetermined angle, is engaged with the driving gear in an interlocking relation so that it may be received and disposed in the swingable driven gear-receiving space; and an output lever transmitting a mechanical output on the locking/unlocking side of a door is rotatably attached to the output gear shaft, to which the swingable driven gear has been fixed.

2. The device as claimed in claim 1, wherein the rotatable coreless armature is formed in a torus shape by molding a resin together with the armature coils and setting the resin.

3. The device as claimed in claim 2, wherein the rotatable coreless armature is formed in a circular shape in a state that cut-off portions are defined between both sides of adjacent armature coils.

* * * * *

UNITED STATES PATENT AND TRADEMARK OFFICE
CERTIFICATE OF CORRECTION

PATENT NO. : 4,995,658

DATED : FEBRUARY 26, 1991

INVENTOR(S) : MANABU SHIRAKI ET AL.

It is certified that error appears in the above-identified patent and that said Letters Patent is hereby corrected as shown below:

Title page, Assignee, change "Sicoh Engineering Co., Ltd.,"

to --Shicoh Engineering Co., Ltd. and Mitsui Mining &

Smelting Co., Ltd.--.

Signed and Sealed this

Sixteenth Day of March, 1993

*Attest:*

STEPHEN G. KUNIN

*Attesting Officer*  *Acting Commissioner of Patents and Trademarks*